April 12, 1932. L. EMERSON 1,853,264
MACHINE FOR PRODUCING CINEMATOGRAPHIC PICTURE EFFECTS
Filed Oct. 16, 1930 2 Sheets-Sheet 1
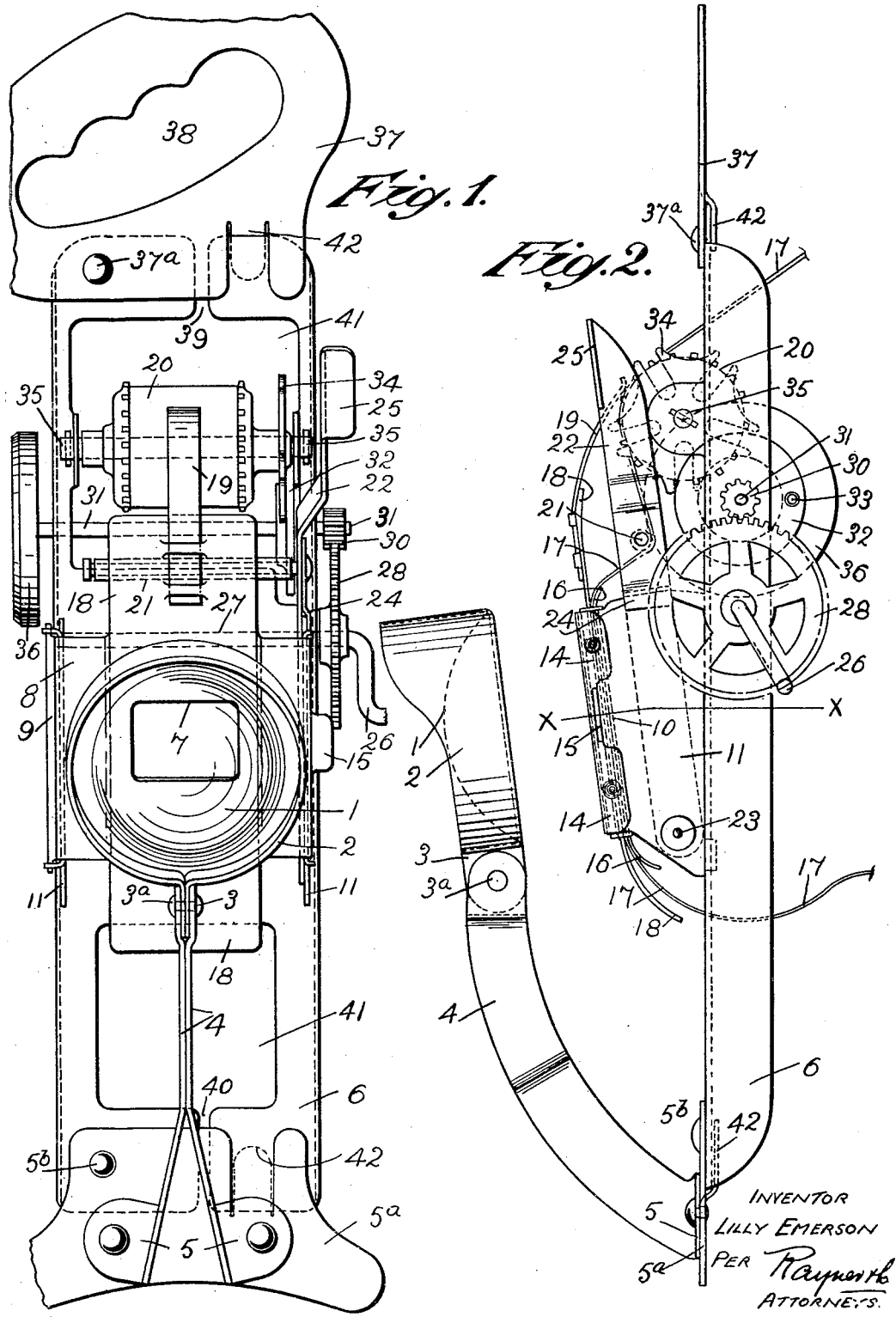
INVENTOR
LILLY EMERSON
PER Raynorth
ATTORNEYS.

April 12, 1932.     L. EMERSON     1,853,264
MACHINE FOR PRODUCING CINEMATOGRAPHIC PICTURE EFFECTS
Filed Oct. 16, 1930      2 Sheets-Sheet 2
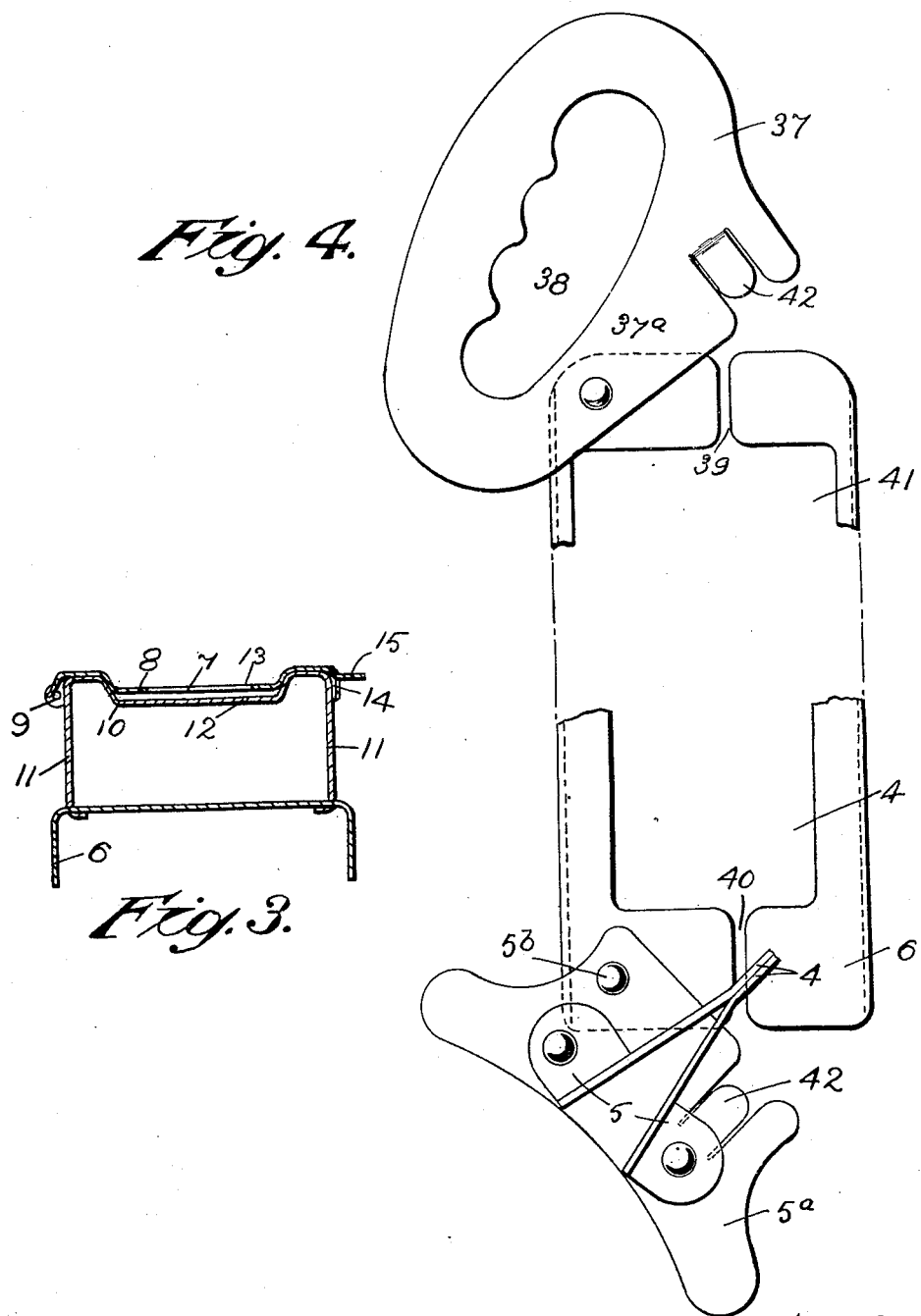

Patented Apr. 12, 1932

1,853,264

UNITED STATES PATENT OFFICE

LILLY EMERSON, OF SUTTON, ENGLAND

MACHINE FOR PRODUCING CINEMATOGRAPHIC PICTURE EFFECTS

Application filed October 16, 1930, Serial No. 489,120, and in Great Britain January 22, 1930.

The chief object of my invention is to produce an improved apparatus whereby the effect of animated pictures can be enjoyed by the use of a compact easily handled apparatus without necessitating a source of light for projecting pictures and if desired also without the necessity of employing photographic film strips. A further object of my invention is to provide an improved and simplified means for readily attaching and removing a strip of pictures from the apparatus. Another object of my invention is to produce in a simple and attractive manner strips of pictures particularly suitable for use with my apparatus.

As is well known, the usual practice in obtaining animated picture effects is to pass a strip of film intermittently through a gate of a lantern or projector having lenses for enlarging the projected images on a screen. However, the use of such apparatus is prohibitive in cost to most persons, and also it is not suited for use by children or others requiring a simple form of apparatus which is cheap and also easy to manipulate. My invention meets this demand and is broadly characterized in that a magnifying glass or lens is provided in front of a gate in a frame carrying hand operated mechanism for feeding a picture carrying strip through the gate, the pictures being observed in the gate through the said magnifying lens or glass.

The apparatus in its preferred form comprises a metal frame with a magnifying view glass mounted on one side in front of a picture gate and provided with a sprocket pulley adapted to convey a strip of pictures through the gate, a handle for rotating the sprocket pulley being fixed to a spindle rotatably supported across the frame and carrying a gear wheel forming part of a speed increasing train of gear wheels for driving a Maltese cross or other suitable device for intermittently rotating the sprocket pulley, the said frame containing openings through which the length of picture bearing strip can be slipped without disassembling the sprocket pulley or other picture feeding mechanism so that the picture strip can be readily located in operative position and removed as desired, means being provided for bringing each picture into correct registration with the gate.

The said frame can consist of a metal plate of shallow channel section about one foot in length and about three inches wide. The actuating mechanism is carried upon the channelled or underside of this plate, and may be covered from view, the only part of the strip required to be visible above, being one picture space, which is viewed through a suitable cover or mask, means being provided for the setting of the picture strip in register with the driving drum or wheel. The operator then holds the machine, preferably in a horizontal position, one end lying against his body, and the outer end held by his hand, whilst the actuating handwheel is turned by his other hand, thus causing the paper picture strip to acquire the characteristic movement, and to produce to the observers the cinematographic effect similar in appearance to the well known illusion of the cinema screen. The picture however, being opaque and open to the daylight may be viewed either from above in the horizontal position or the machine may be held in a vertical position with the same effect. A magnifying lens is provided, or if desired a group of viewing lenses may be fitted, so that several persons may observe the moving picture strip at the same time.

Any other type of mechanism may if desired be utilized for driving the picture strip, as for example a claw, or cam, or friction driving device, providing that such means may be capable of giving the necessary periodic movements to the succession of pictures printed upon the strip.

The strips may be of any convenient length. For a comparatively short strip, as for example a strip showing the development of a dance step, or a physical exercise, the two ends may conveniently be joined to make an endless band. Or, for longer subjects, the strip may be rolled up and fed into the machine from a magazine box or spool attached at the rearward end. The slack may then run out freely and be afterwards rewound for repetition. Or, if desired a take-up reel or magazine may be fitted to receive the free end as it comes off the machine.

The picture strips themselves may consist of paper or other non-transparent material. The pictures may be photographically printed or they may be printed by letter press in black and white or in colours. Pictures may be printed upon both sides of the strips so that by turning them over (or in some cases by changing over the magazines) both sides may be shown in succession.

In order that my invention may be clearly understood and readily carried into effect I have appended hereto a sheet of drawings illustrating an embodiment thereof, and wherein:—

Fig. 1 is a front elevation view of the apparatus.

Fig. 2 is a side elevation view of Fig. 1.

Fig. 3 is a section on the line X—X of Fig. 2, and

Fig. 4 is a broken detail front elevation view showing the improved means for affixing and removing the picture strips.

Referring to the drawings I have shown a device suitable for holding in the hand and in which the pictures are viewed through a magnifying glass 1 mounted in a ring shaped holder 2 which for cheapness and simplicity of manufacture can be a strip of metal bent to cylindrical form, its ends being bent upon each other, and as indicated by the reference numeral 3, held between a pair of strips of metal 4 formed with lugs 5 at their lower ends whereby they are rivited to a bracket 5a pivoted to a metal plate 6 comprising the main frame of the apparatus. The strips 4 are splayed outwards inverted V fashion at their lower ends to provide a rigid support for the magnifying glass. The holder 3 can be adapted to pivot about the rivet or pin 3a by which it is secured to the members 3.

The glass 1 is located in front of and suitably spaced from a gate 7 which can be an opening in a metal plate 8 hinged along one vertical edge 9 so that it can be swung away from a picture strip guide plate 10 fixed to the frame 6 and bent wide U shape to form two side limbs 11 for attachment to the frame 6 and also bent at its centre to provide a channel 12 along which the picture strip is guided, this channel 12 receiving a like part 13 of the gate plate 8. The free end of the gate plate 8 is bent towards the frame 6 to provide a lip 14 to abut against the outer face of one of the limbs 11 of the guide plate 10, a tongue 15 being bent from the centre of this lip to provide a thumb piece for opening the gate for removing or locating a picture strip.

The upper and lower edges of the channel 12 of the guide plate 10 are extended as arcuate picture strip guiding surfaces 16 to form smooth surfaces over which the picture strip 17 can be guided, the channelled part 13 of the gate plate 8 also being likewise arcuately extended at its upper and lower edges as indicated at 18. The upper extension 18 carries an upwardly projecting leaf spring 19 bent towards the frame 6 and pressing at its free end against the periphery of a sprocket pulley 20 over which the picture strip 17 is passed, this strip being perforated to receive the teeth of the sprocket pulley 20 whereby the picture strip is drawn through the gate. Proper registration of the pictures in the gate can be effected by passing the picture strip under or over a transverse spindle 21 extending laterally from the inner side of an arm 22 pivoted at its lower end to the lower end of one of the side limbs 11 of the plate 10 by a rivet 23. This arm 22 is pressed tightly against the inner face of the said limb 11 of the plate 10 and has a depending abutment 24 fixed to its outer side bearing against the outer face of the said limb. The upper free end of this arm 22 can be formed with a lateral finger piece 25 whereby it can be pressed towards or away from the frame 6 to adjust the position of a picture in the gate 7.

The sprocket pulley 20 can be driven from a handle 26 fixed to one end of a spindle 27 supported across the side limbs of the channel section frame 6, this spindle 27 carrying a gear wheel 28 meshing with a smaller gear wheel 30 on a spindle 31 also mounted across the frame 6 and carrying a disc 32 formed with a lateral pin or roller 33 adapted to successively engage the slots of a Maltese cross 34 fixed to one end of the spindle 35 of the sprocket pulley 20. A weighted balance or inertia wheel 36 is preferably fixed to the other end of the spindle 35 to assist in a regular turning of the handle 26.

The apparatus is adapted to be held in one hand and the handle 26 turned with the other hand, and for this purpose the upper end of frame 6 is fitted with a plate 37 apertured as at 38 to a configuration appropriate to the reception of the fingers of a hand. This finger plate 37 and the plate 5a at the other end of the frame 6 are pivoted on pins 37a and 5b respectively whereby they can be swung away from the end of the frame 6 to expose vertical slits 39 and 40 in the ends of the frame 6, these slits communicating with gaps 41 in the frame 6 through which the picture 17 can pass. By means of these slits 39 and 40 a picture strip can be inserted in the apparatus and laid over the sprocket pulley 20 and in the guide channel 12, the gate plate 8 being swung open about its hinge 9, it being apparent that the magnifying glass 1 will have been moved clear of the gate when the plate 5a is swung about its pivot 5b to expose the slit 40. The plates 37 and 5a are normally held against movement relative to the frame 6 by resilient tongues 42 bent rearwards from them and adapted to bear against the rear face of the frame 6.

The form of picture strip suitable for use with this apparatus is of a non-transparent nature and can be a paper strip on which are pasted or printed a succession of pictures. The pictures may be prepared on both sides of the strip so that two sets of pictures can be carried on one strip. Each strip may be endless and any considerable length of slack picture strip can hang freely from the gate or can be accommodated in a box-like chamber fitted against the rear face of the frame 6.

In a modification of the invention, the mechanism may be so adapted that in place of the handwheel, an extension shaft having a frictional or other driving means may be fitted for connection to the driving mechanism of a gramophone machine. Then the cinema effects may be observed in conjunction with a gramophone record so that an animatively illustrated lecture or lesson or the like may be effectively rendered by the combination. As for example, the movements of a dancing step, a physical exercise or other subjects may be observed accompanied by their appropriate words or music. Another alternative method of constructing the paper strip will be from strips such as may be printed in a newspaper, magazine or publication which can be cut out and mounted upon a somewhat stronger strip material perforated and otherwise adapted for use in the machine.

I claim:—

1. A cinematograph picture machine comprising a frame provided with a gate opening through which a picture strip may be viewed, a sprocket pulley and intermittent feeding mechanism for moving the picture strip, a movable plate at one end of the frame normally covering a slit in the frame and a movable handle at the other end also covering a slit in the frame both being adapted to be displaced to enable the picture strip to be placed in position for use.

2. A cinematograph picture machine comprising a frame provided with a gate opening through which a picture strip may be viewed, a sprocket pulley and intermittent feeding mechanism for moving the picture strip, a movable plate at one end of the frame normally covering a slit in the frame and a movable handle at the other end also covering a slit in the frame both being adapted to be displaced to enable the picture strip to be placed in position for use and a viewing lens mounted in a holder carried by a movable plate and arranged in position for viewing the picture through the lens when the plate is covering the slit in the frame.

3. A cinematograph picture machine comprising a frame provided with a gate opening through which a picture strip may be viewed, a sprocket pulley and intermittent feeding mechanism for moving the picture strip, a spindle engaging the picture strip adjustable relatively to the frames for adjusting the location of the picture in the gate, a movable plate at one end of the frame normally covering a slit in the frame and a movable handle at the other end also covering a slit in the frame both being adapted to be displaced to enable the picture strip to be placed in position for use.

4. A cinematograph picture machine comprising a frame provided with a gate opening through which a picture strip may be viewed, a sprocket pulley and intermittent feeding mechanism for moving the picture strip, a spindle engaging the picture strip adjustable relatively to the frames for adjusting the location of the picture in the gate, a movable plate at one end of the frame normally covering a slit in the frame and a movable handle at the other end also covering a slit in the frame both being adapted to be displaced to enable the picture strip to be placed in position for use, and a viewing lens mounted in a holder carried by movable plate and arranged in position for viewing the picture through the lens when the plate is covering the slit in the frame.

5. A cinematograph picture machine comprising a frame, a plate pivoted to a U-shaped plate fixed to the frame channels between the plates to receive the picture strip, both the movable plate and the frame being provided with a gate opening through which a picture strip may be viewed, a sprocket pulley and intermittent feeding mechanism for moving the picture strip, a movable plate at one end of the frame normally covering a slit in the frame and a movable handle at the other end also covering a slit in the frame both being adapted to be displaced to enable the picture to be placed in position for use.

6. A cinematograph picture machine comprising a frame, a plate pivoted to a U shaped plate fixed to the frame channels between the plates to receive the picture strip both the movable plate and the frame being provided with a gate opening through which a picture strip may be viewed, a sprocket pulley and intermittent feeding mechanism for moving the picture strip, a spindle engaging the picture strip adjustable relatively to the frames for adjusting the location of the picture in the gate, a movable plate at one end of the frame normally covering a slit in the frame and a movable handle at the other end also covering a slit in the frame both being adapted to be displaced to enable the picture to be placed in position for use.

7. A cinematograph picture machine comprising a frame, a plate pivoted to a U shaped plate fixed to the frame channels between the plates to receive the picture strip both the movable plate and the frame member being provided with a gate opening through which a picture strip may be viewed, a sprocket pulley and intermittent feeding mechanism for moving the picture strip, a spindle engaging the picture strip adjustable relatively to the frames for adjusting the location of the picture in the gate, a movable plate at one end of the frame normally covering a slit in the frame and a movable handle at the other end also covering a slit in the frame both being adapted to be displaced to enable the picture to be placed in position for use and a viewing lens mounted in a holder carried by a movable plate and arranged in position for viewing the picture through the lens when the plate is covering the slit in the frame.

LILLY EMERSON.